UNITED STATES PATENT OFFICE.

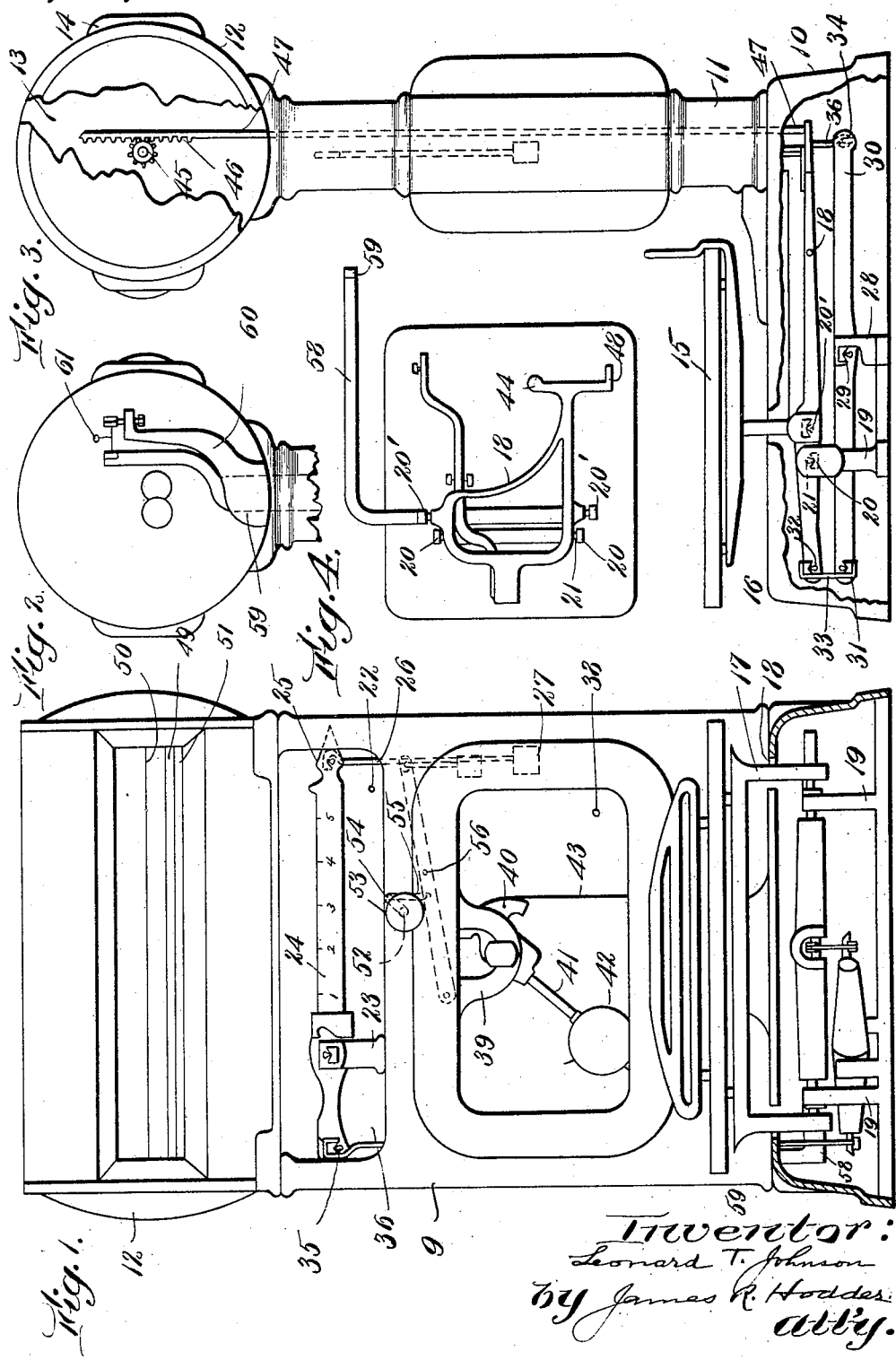

LEONARD T. JOHNSON, OF BOSTON, MASSACHUSETTS.

SCALE.

1,375,636.     Specification of Letters Patent.     Patented Apr. 19, 1921.

Application filed February 17, 1919. Serial No. 277,525.

*To all whom it may concern:*

Be it known that I, LEONARD T. JOHNSON, a citizen of the United States, and a resident of Boston, Massachusetts, (whose post-office address is 103 Bloomfield street, Dorchester, Massachusetts,) have invented an Improvement in Scales, of which the following description, in connection with the accompanying drawings, is a specification, like letters on the drawings representing like parts.

My present invention relates to automatic scales of the platform type, and more particularly to automatic scales of the computing and price indicating type.

In the scales of this type as usually manufactured, the capacity of the scale is limited to comparatively few pounds, in order that the scale be sensitive, quick, and accurate in operation. As it is frequently necessary to weigh objects exceeding in weight the ordinary capacity of the scale, various methods have been devised for increasing the capacity thereof, while yet retaining the desirable qualities of sensitive, quick and accurate operation. None of these methods have been very successful, because they require the use of a heavy counterpoise on the main lever.

A feature of my invention therefore, is a cylinder computing scale in which the capacity of the scale may be increased while retaining the desirable sensitive, quick and accurate operation. In carrying out this feature I eliminate the use of a heavy counterpoise on the main lever by connecting the tare beam to the main lever by means of an under lever.

Another feature of my invention is the arrangement of the tare beam in such a manner that it releases from the load resistance mechanism the weight of the platform and platform rest.

Still another feature of my invention is the provision of improved means for instantly changing the capacity of the scales. In carrying out this feature I provide a shot cup on the end of the tare beam, and in operative relation to this shot cup I arrange a weight capable of doubling the capacity of the scales. This weight is carried at the free end of a pivoted lever, which is raised or lowered at will by a handle arranged on the face of the scale.

In doubling the capacity of the scale, the usual chart on the computing cylinder, indicating total cost at different prices per pound, will be inaccurate. If, for example, a scale of this type weighs and computes the value of articles at different prices per pound, up to fifteen pounds, such computations will be inaccurate when the capacity of the scale is increased. When such an increase in capacity is made, it is necessary to provide means for indicating the value of objects weighing more than the original capacity of the scale and in my invention I provide for this feature by having an additional row of computations on the chart and adjacent to the row showing prices per pound. This additional row gives the computed value, at the various prices per pound, of fifteen pounds,—the original capacity of the scale—these computed values to be added to the value appearing above the prices per pound on the rotating scale drum, thus giving the total when the capacity increasing weight has been deposited in the shot cup.

Other features of the invention, novel details of construction, and important advantages will be hereinafter more fully pointed out and claimed.

Referring to the drawings illustrating a preferred embodiment of my improved scale, Figure 1 is a front view, partly in section.

Fig. 2 is an end view of the rotatable cylindrical scale, showing the method of attaching the extension of the platform rest to the cylindrical scale.

Fig. 3 is a side view, partly in section, showing the cylindrical scale drive and the system of levers employed in connection with the platform or scale pan, and Fig. 4 is a plan view of the system of levers shown in Fig. 3.

In the drawings, 10 designates a base, at one end of which is attached a vertical hollow support or standard 11. At the upper end of this support or standard 11 is mounted a casing 12, in which is rotatably mounted a cylindrical computing scale 13. The scale 13 is mounted for rotation in any convenient manner, and as such method of mounting is conventional it need not be described. The casing 12 is provided with diametrically arranged sight openings 14, to permit the scale indications to be read by customer and merchant simultaneously.

The weighing platform 15, which is preferably of glass, is mounted in the usual manner on the platform rest 16. Depending arms 17 on the lower side of the platform rest 16 extend through openings 18 in the upper face of the base 10, and are pivotally mounted on the horizontal main lever 18, as shown at 20—20' in Figs. 1 and 4. Bearing pedestals 19—19 extend upwardly from the lower face of base 10, bearings 20—20 being provided at the upper end thereof for the main lever 18, outwardly extending pins 21—21 on the main lever 18 resting on the bearings 20—20.

The lower portion of the platform rest 16 has an extension 58 extending forwardly to a point beneath the hollow support 11. An upwardly extending member 59 on the extreme forward end of 58 is connected at its upper end to the upper end of an arm 60, integral with the hollow standard 11, by a link 61, which link, being parallel to and of a length substantially equal to a line connecting the fulcrum points 20 and 20', insures that all movements of the platform 15 have a parallel character.

At the top of the hollow support or standard 11, and below the casing 12, is an opening 22. On the lower portion of this opening is a bearing pedestal 23, in which is mounted a tare beam 24, of the usual type. The outer or free end 25 of this tare beam 24 has pivotally attached thereto a depending rod 26, to the lower end of which is attached a shot cup 27.

A bearing pedestal 28 extends upwardly from the base 10 and carries a bearing 29, for the under lever 30, as clearly shown in Fig. 3. The outer end of this under lever 30 is provided with a bearing 31, similar to a bearing 32 on the outer end of the main lever 18, a double stirrup bearing 33 connecting the levers 18 and 30. The housing end of lever 30 is provided with a bearing 34, similar in construction to the bearing 35 on the end of the tare beam 24. A rod 36, provided at each end with bearings 37—37, coöperating with the bearings 34 and 35, connects the lever 30 and tare beam 24. For clearness of illustration, the rod 36 is not shown in Fig. 3, in the short space above lever 18.

An opening 38 in the hollow standard or support 11, below the tare beam opening 22, is provided with a bearing member 39, in which is rotatably mounted a quadrant 40. Extending downwardly from the quadrant 40 is a rod 41, at the lower end of which is attached a weight 42. At the upper end of the quadrant 40 is attached, in any convenient manner, a metal band 43 which extends downwardly and is attached at 44 to the housing end of the main lever 18.

To the end of the shaft of the cylindrical scale 13 is fastened a pinion 45, with which meshes the rack 46 on the rack rod 47. The lower end of this rack rod 47 is attached at 48 to the housing end of the main lever 18.

As so far described, it is evident that if an object is placed on the platform 15, the housing end of the main lever will be lowered, causing a downward movement of the metal band 43 and rack rod 47, with a resultant outward movement of the weight 42 and rotative movement of the cylindrical scale 13, respectively.

A shaft 52, journaled in the hollow support or standard 11, is provided at its outer end with a knob 53, and by means of which the shaft 52 may be rotated. Intermediate the ends of the shaft 52 is fastened a crank arm 54, at the outer end of which is attached one end of a connecting rod 55, the other end of which is attached to a lever 56 pivoted in the hollow standard 11. The free end of this lever 56 has attached thereto a weight 57 and it will be obvious that, by properly rotating the shaft 52, the weight 57 may be deposited in, or removed from, the shot cup 27, thus increasing the capacity of the scale or returning it to its original capacity, as desired.

Attached to the casing 12 behind the sight openings 14 is a horizontal scale 49 on which are marked the prices per pound. Above the scale 49 and parallel thereto is the hair line 50, behind and beneath which, as the cylindrical scale 13 rotates, appear the computations for less than fifteen pounds, or within the capacity of the scale. Under scale 49 is a second stationary scale 51 on which is indicated the computed values for fifteen pounds, or the capacity of the scale, for various prices per pound. When the capacity of the scale is increased, the value appearing on scale 51 is added to the value appearing above this price per pound under the hair line 50, thus giving the total value when the weight of the object exceeds fifteen pounds.

The operation of my invention, assuming the object to be weighed is less than fifteen pounds, or the capacity of the scale, is as follows:—

The object to be weighed is placed on the platform 15, and causes a downward movement of the housing end of the main lever 18. Rack rod 47 and metal band 43 are pulled downwardly causing a rotative movement of the cylinder scale 13 and an outward movement of the weight 42, respectively. When the platform comes to rest, the value of the object weighed, at the appropriate price per pound, is read off directly on the row of figures appearing below the hair line 50 and opposite the price per pound in the row of figures in row 49.

If the object to be weighed is heavier than fifteen pounds, or more than the usual capacity of the scale, the knob 53 is rotated in a clockwise direction to rotate the shaft 52 and lower the weight 57 into the shot cup 27. This operation is equivalent to placing fifteen pounds on one end of the tare beam 24, which, through the connecting rod 36 raises the housing end of the under lever 30 upward, when the outer end, acting on the main lever 18 through the double stirrup 33, forces the platform 15 upward with a force equivalent to fifteen pounds. The object to be weighed is now placed on the platform 15, and when the platform comes to rest, the value of the object, as indicated opposite the appropriate price per pound, is added to the corresponding value of fifteen pounds, appearing in the row 51 to give the total value of the object.

It is obvious that I may, by disconnecting the rod 47 from the point 48, and the metal band 43 from the point 44, operate the tare beam 24 alone as a plain pound and ounce scale.

Having now described my invention, what I claim as new and desire to secure by Letters Patent is:—

1. The combination of an indicator, of a pivoted lever operatively connected thereto, a tare beam, a second lever arranged beneath and substantially parallel to said first lever, connecting means for coupling the levers together, and means for operating the tare beam by the first lever through the medium of the second lever.

2. The combination of an indicator, of a pivoted lever operatively connected thereto, a tare beam, a second lever arranged beneath and substantially parallel to said first lever, connecting means for coupling the levers together, means for operating the tare beam by the first lever through the medium of the second lever, a shot cup attached to the tare beam, a weight located adjacent the shot cup, and means for depositing the weight in, or removing it from, the shot cup, at will.

3. In a device of the class described, a main lever, a platform supporting rest mounted on said lever at one side of its fulcrum, an under lever, a link connecting the end of the main lever, on the opposite side of its fulcrum to the point of support of the platform supporting rest, to one end of the under lever, a tare beam, and connecting means extending from one end of the tare beam to the other end of the under lever.

4. The combination of a base, of a standard or support mounted at one end thereof, an indicator located at the top of said standard, a main lever operatively connected to said indicator, an under lever arranged beneath and substantially parallel to said main lever, and extending to a point beneath the standard, a tare beam mounted in said standard below the indicating means, operative means extending from said tare beam to the end of the under lever beneath the standard, and means connecting the under lever and the main lever, whereby the tare beam is operated by the main lever through the under lever.

5. The combination of a base, of a standard or support mounted at one end thereof, an indicator located at the top of said standard, a main lever operatively connected to said indicator, a counterpoise equivalent for said main lever comprising a tare beam, an under lever located parallel to said main lever, and connected, one end to the tare beam and the other end to said main lever.

6. The combination of a base, of a standard or support mounted at one end thereof, a tare beam mounted in said standard, a main lever, a commodity platform mounted thereon, an under lever located beneath and substantially parallel to said main lever, operative connections between said levers, and connecting means between said under lever and the tare beam.

In testimony whereof, I have signed my name to this specification, in the presence of two subscribing witnesses.

LEONARD T. JOHNSON.

Witnesses:
JAMES R. HODDER,
RACHAEL L. CLARK.